No. 831,187. PATENTED SEPT. 18, 1906.
J. P. RITSCHARD & L. A. SELL.
COLANDER FOR VEGETABLES, &c.
APPLICATION FILED MAY 29, 1905.
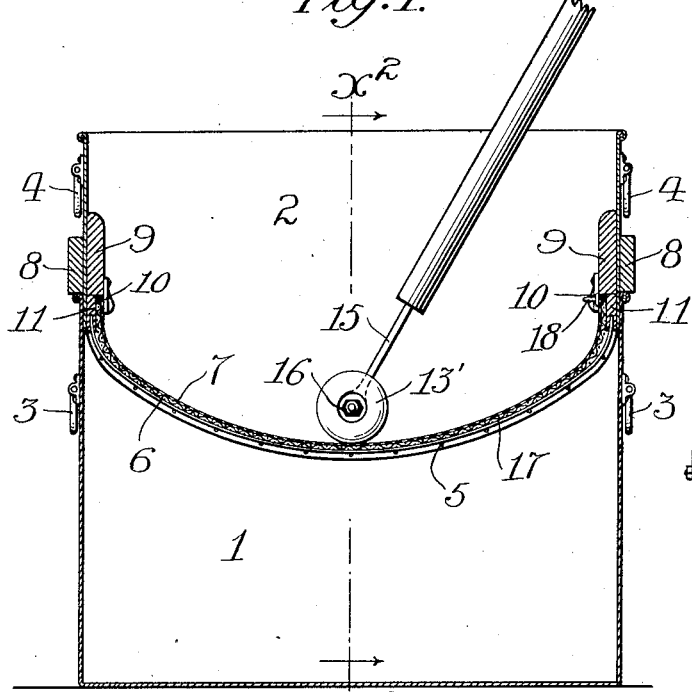
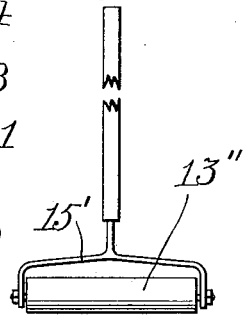
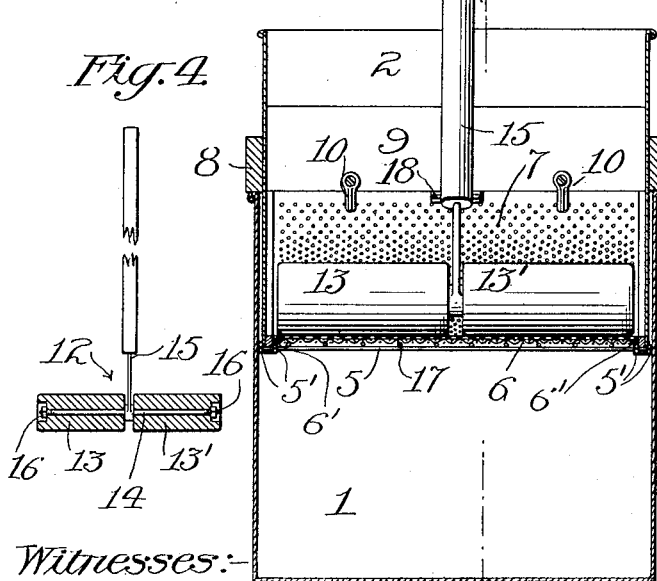
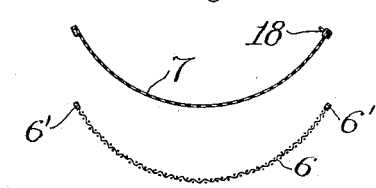
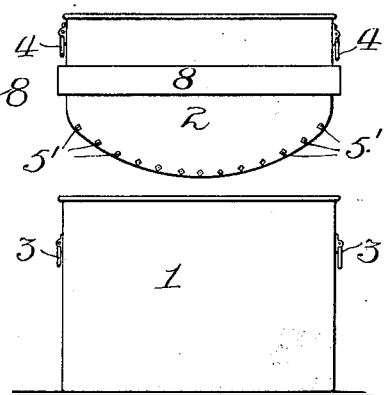
Witnesses:—
Inventors;
John Paul Ritschard,
Leroy A. Sell.
by Townsend Bros
Their Attys.

UNITED STATES PATENT OFFICE.

JOHN PAUL RITSCHARD AND LEROY A. SELL, OF LOS ANGELES, CALIFORNIA.

COLANDER FOR VEGETABLES, &c.

No. 831,187.   Specification of Letters Patent.   Patented Sept. 18, 1906.

Application filed May 29, 1905. Serial No. 262,720.

*To all whom it may concern:*

Be it known that we, JOHN PAUL RITSCHARD, a citizen of Switzerland, and LEROY A. SELL, a citizen of the United States, residing at Los Angeles, in the county of Los Angeles and State of California, have invented a new and useful Colander for Vegetables, &c., of which the following is a specification.

This invention relates to a machine for reducing vegetables or other food substances to a suitable mashed or crushed condition for use in soups, purées, &c.

The main object of the invention is to provide an apparatus for this purpose which will be rapid and effective in operation and simple and cheap in construction.

The invention is applicable in the preparation of potatoes, tomatoes, apples for sauce, berries for jams, jellies, or preserves, meats for soups, or in any crushing or pressing process or canning or pickling process.

The accompanying drawings illustrate the invention.

Figure 1 is a vertical section on line $x'$ $x'$, Fig. 2. Fig. 2 is a transverse section on line $x^2$ $x^2$, Fig. 1. Fig. 3 is an end elevation of the several members of the apparatus arranged in separate order one above the other. Fig. 4 is a detailed section of a roller device used with the apparatus. Fig. 5 is an elevation of a different form of the forcing-roller.

1 designates a suitable box, receptacle, or can, preferably galvanized iron, for receiving the comminuted or divided material.

2 designates a hopper or receptacle for receiving the material to be operated upon, the member 2 preferably resting directly on the top edge of member 1. Each of said members 1 and 2 is preferably provided with handles 3 4 for lifting and moving same and for removing member 2 from member 1 or inserting it therein. Each of said members is open-topped, and member 1 is closed at the bottom and sides.

Member 2 has two perforate or foraminous bottoms one (indicated at 6) made of wire-netting of suitable mesh for crushing vegetables, fruits, &c., and the other (indicated at 7) consisting of a perforated plate, the openings of which are smaller than the aforesaid mesh. Both of said bottoms 6 and 7 are removably supported on an open-work bottom frame or support consisting of bars or rods 5, extending transversely of the member 2 and passing through the side walls thereof and fastened by nuts 5' at their ends, and wires 17, which rest on said bars 5 and extend longitudinally of the member 2, being inserted or connected at their ends in the end walls of said member 2.

The wire-netting or bottom member 6 has its edges reinforced with solder or a narrow strip of tin or suitable metal soldered on the edge, as indicated at 6', to prevent the wire from becoming disengaged and also to keep the edges of the member 6 firmly against the side of the hopper or member 2, so as to prevent the vegetables or material being forced between said members 6 2 before being properly crushed. The bottom of the member 2 is preferably cylindroidal in contour, rising at each end and dipping in the middle, so that the sieves 6 7, which are flexible, so as to conform to said bottom, will furnish surfaces adapted for the reception of the material and for the forcing action hereinafter described.

18 designates a handle for member 7.

The upper member 2 may have side cleats or strips 8, whose lower edges form shoulders to rest on the top edges of member 1 and may have internal cleats or strips 9, located somewhat above the bottom edge of member 2, the lower edges of said strips forming shoulders for engaging the ends of sieves 6 7, which are held or locked thereunder by means of buttons 10, pivoted to said strips 9 and adapted when depressed to extend below the bottom edge of strips 9. The rods or wires 17 are attached at their ends to cleats or strips 11, fastened to the end walls of member 2, leaving between said cleats 11 and buttons 10 sufficient space for the reception of the foraminous bottom members 6 7. These cleats form shoulder portions on the respective end walls extending over the upturned ends of the body members 6 7 to hold said members down on the open frame 5 17. The buttons or movable retainers 10 serve to hold the foraminous bottom members from accidental displacement. The concave open-bottom framework 5 17 is curved upwardly more sharply toward the ends and the extremities thereof extend vertically and the foraminous bottom members, when in place, conform to this shape of the bottom frame. The sharp upward curve at each end of the bottom members, produced as above set forth, is of advantage in facilitating the effective action of the roller, since the roller on reaching the end of its stroke comes against the foraminous wall extending directly in front of it, causing the material to be forced through said wall by the roller.

12 designates a pressing or forcing device, consisting of rollers 13 13', mounted on the shaft or arbor 14, extending transversely from a handle-bar 15, said rollers being secured by nuts 16 at the outer ends of shaft 14. This forcing device may be formed of a single roller, as indicated at 13'' in Fig. 5, journaled in a yoke or fork 15'. In either case the forcing device is freely movable both along the bottom of the receptacle 2 and toward said bottom, so as to bring it in contact with the bottom or to press any intervening material forcibly against and through the bottom.

The operation is as follows: The material which is to be mashed, crushed, or comminuted—for example, potatoes or other vegetables, apples, berries, or other fruit, or meat—will generally be first steamed or boiled and then placed in the receptacle or member 2, which is placed on member 1 with one or both of the sieves 6 7 in place at the bottom of said member 2, some materials requiring only the single wire-netting sieve 6 and others requiring for their effectual pulping the more finely-perforated member 7, which in that case is placed on the sieve 6—for example, for use in soups. The roller device 12 is then applied in the member 2 to press the contents or materials therein against the bottom thereof and force said material through the perforate bottom of member 2, thereby mashing and crushing said material to a fine pulp. It will be seen that all of the parts can be separated from each other for inspection or cleaning thereof.

The apparatus may be variously modified without departing from the invention. For example, the perforated bottom member 2 may be of any desired shape, and in place of the perforate frame or supporting means 5 17 above described any suitable supporting means may be supplied.

The device may be made in different sizes for use by hotels, restaurants, or private houses.

What we claim is—

1. A lower box-receptacle and an upper box-receptacle fitting in the lower receptacle and having a shoulder portion resting on the lower receptacle, the side walls of said upper receptacle having downwardly-curved lower edges, a concavely-curved open framework secured to the side and end walls of the upper receptacle at the bottom thereon, shoulder portions on the end walls of the upper receptacle, a foraminous bottom resting on said open framework and with its ends extending under the said shoulder portions on the end walls to hold the foraminous bottom down on the open bottom frame, movable retainers on the end walls at said shoulder portions to retain the foraminous bottom frame in place, and a cylindrical roller device whose length is substantially equal to the width of the receptacle, manually and freely movable along, toward and against the bottom and having an operating-handle.

2. A lower box-receptacle and an upper box-receptacle fitting in the lower receptacle and having a shoulder portion resting on the lower receptacle, the side walls of said upper receptacle having downwardly-curved lower edges, a concavely-curved open framework secured to the side and end walls of the upper receptacle at the bottom thereon, shoulder portions on the end walls of the upper receptacle, a foraminous bottom resting on said open framework and with its ends extending under the said shoulder portions on the end walls to hold the foraminous bottom down on the open bottom frame, the foraminous bottom being curved upwardly more sharply toward the ends and terminating in vertical portions directly under the shoulders on the end wall, and a cylindrical roller device whose length is substantially equal to the width of the receptacle, manually and freely movable along, toward and against the bottom and having an operating-handle.

In testimony whereof we have hereunto set our hands, at Los Angeles, California, this 22d day of May, 1905.

JOHN PAUL RITSCHARD.
LEROY A. SELL.

In presence of—
ARTHUR P. KNIGHT,
JULIA TOWNSEND.